United States Patent
Nia et al.

(10) Patent No.: US 12,380,357 B2
(45) Date of Patent: Aug. 5, 2025

(54) EFFICIENT AND SCALABLE COMPUTATION OF GLOBAL FEATURE IMPORTANCE EXPLANATIONS

(71) Applicant: Oracle International Corporation, Redwood Shores, CA (US)

(72) Inventors: Karoon Rashedi Nia, Vancouver (CA); Tayler Hetherington, Vancouver (CA); Zahra Zohrevand, Vancouver (CA); Sanjay Jinturkar, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1152 days.

(21) Appl. No.: 17/107,858

(22) Filed: Nov. 30, 2020

(65) Prior Publication Data

US 2022/0172105 A1 Jun. 2, 2022

(51) Int. Cl.
*G06N 20/00* (2019.01)
*G06F 18/211* (2023.01)
*G06N 5/04* (2023.01)
*G06N 5/045* (2023.01)

(52) U.S. Cl.
CPC .......... *G06N 20/00* (2019.01); *G06F 18/211* (2023.01); *G06N 5/04* (2013.01); *G06N 5/045* (2013.01)

(58) Field of Classification Search
CPC .............................. G06N 20/00; G16H 40/63
USPC ..................................................... 706/12, 48
See application file for complete search history.

(56) References Cited

U.S. PATENT DOCUMENTS

| | | | | |
|---|---|---|---|---|
| 8,473,446 | B2 * | 6/2013 | Browne | G06F 18/2415 |
| | | | | 706/48 |
| 11,853,853 | B1 * | 12/2023 | Beauchesne | G06F 18/2133 |
| 2019/0130994 | A1 * | 5/2019 | Ruderman | G16B 40/10 |
| 2019/0392351 | A1 * | 12/2019 | Zuluaga | G06N 20/20 |
| 2020/0371111 | A1 * | 11/2020 | Holohan | G16B 30/00 |
| 2021/0225513 | A1 * | 7/2021 | Manrai | G16H 50/20 |
| 2021/0295213 | A1 * | 9/2021 | Raveh | G06V 10/764 |
| 2021/0375392 | A1 * | 12/2021 | Polcari | G16B 40/20 |

(Continued)

FOREIGN PATENT DOCUMENTS

WO  WO-2021046477 A1 * 3/2021 ............. G16H 40/63

OTHER PUBLICATIONS

Vanschoren et al., "OpenML: Networked Science in Machine Learning", SIGKDD Explorations 15(2), dated Aug. 1, 2014, 12 pages.

(Continued)

*Primary Examiner* — Ruay Ho
(74) *Attorney, Agent, or Firm* — Hickman Becker Bingham Ledesma LLP

(57) ABSTRACT

End-to-end explanation techniques, which efficiently explain the behavior (feature importance) of any machine learning model on large tabular datasets, are disclosed. These techniques comprise two down-sampling methods to efficiently select a small set of representative samples of a high-dimensional dataset for explaining a machine learning model by making use of the characteristics of the dataset or of an explainer of a machine learning model to optimize the explanation quality. These techniques significantly improve the explanation speed while maintaining the explanation quality of a full dataset evaluation.

23 Claims, 5 Drawing Sheets

(56) References Cited

U.S. PATENT DOCUMENTS

2023/0060252 A1\* 3/2023 Bly ...................... G06F 18/285

OTHER PUBLICATIONS

Sander, Jörg, et al. "Density-based Clustering in Spatial Databases: The Algorithm gdbscan and its Applications." Data mining and knowledge discovery 2.2, dated 1998, 30 pages.
Ribeiro et al., "Why Should I Trust You?" Explaining the Predictions of Any Classifier. 22nd ACM SIGKDD International Conference on Knowledge Discovery and Data Mining,dated Aug. 9, 2016, 10 pages.
Ribeiro et al., "Anchors: High-precision Model-agnostic Explanations." Thirty-Second AAAI Conference on Artificial Intelligence, dated 2018, 9 pages.
Molnar, Christoph. "Interpretable Machine Learning. A Guide for Making Black Box Models Explainable", dated Nov. 27, 2020, https://christophm.github.io/interpretable-ml-book/, 3 pages.
Lundberg et al., "A Unified Approach to Interpreting Model Predictions." Advances in neural information processing systems, dated Nov. 25, 2017, 10 pages.
Jang et al. "DBSCAN++: Towards Fast and Scalable Density Clustering.", dated May 17, 2019, 12 pages.
Ester, Martin, et al. "A Density-based Algorithm for Discovering Clusters in Large Spatial Databases with Noise." Kdd. vol. 96. No. 34., dated 1996, 6 pages.
Breiman, Leo. "Random Forests." Machine learning 45.1, dated Jan. 2001, 33 pages.

\* cited by examiner

EFFICIENT AND SCALABLE COMPUTATION OF GLOBAL FEATURE IMPORTANCE EXPLANATIONS

FIELD OF THE INVENTION

The techniques and approaches described herein, relate to the field of machine learning, particularly efficiently explaining importance of features related to a machine learning model.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Machine learning is becoming ubiquitous for two main reasons: its ability to solve complex problems in a variety of different domains and the growth in the performance and efficiency of modern computing resources to support machine learning algorithms. However, as the complexity of problems continues to increase, so does the complexity of the machine learning models applied to these problems.

Deep learning is a prime example of this trend. Traditional machine learning algorithms, such as basic neural networks, may only contain a few layers of densely connected neurons, whereas deep learning algorithms, such as convolutional neural networks, may contain tens to hundreds of layers of neurons performing vastly different operations. Increasing the depth of the model and heterogeneity of layers provides many benefits. For example, going deeper can increase the capacity of the model, improve the generalization of the model, and provide opportunities for the model to filter out unimportant features alongside training, while including layers that perform different operations can greatly improve the performance of the model. However, these optimizations come at the cost of increased complexity and reduced interpretability.

Interpreting machine learning models or providing explanations for machine learning models enables an understanding of what a machine learning model has learned and why the machine learning model makes certain predictions. For example, a machine learning model may be used to predict if a patient requires a specific medication or not, given input data characterizing the patient's health and history by features. An understanding of why the machine learning model made a given prediction with respect to these features allows the doctor to decide whether to trust or how to use the machine learning model.

Some machine learning models other than neural networks may be considered inherently interpretable because the relationship of the features in such a machine learning model can be clearly observed. However, even relatively simple neural networks with a few layers can be challenging to interpret, as multiple layers combine the effects of features of data to learn from and increase the number of operations between the model inputs and outputs. Consequently, it would be helpful to have advanced techniques to aid with the interpretation of complex machine learning models.

BRIEF DESCRIPTION OF THE DRAWINGS

In the drawings of certain embodiments in which like reference numerals refer to corresponding parts throughout the figures.

DETAILED DESCRIPTION

Figure 1:
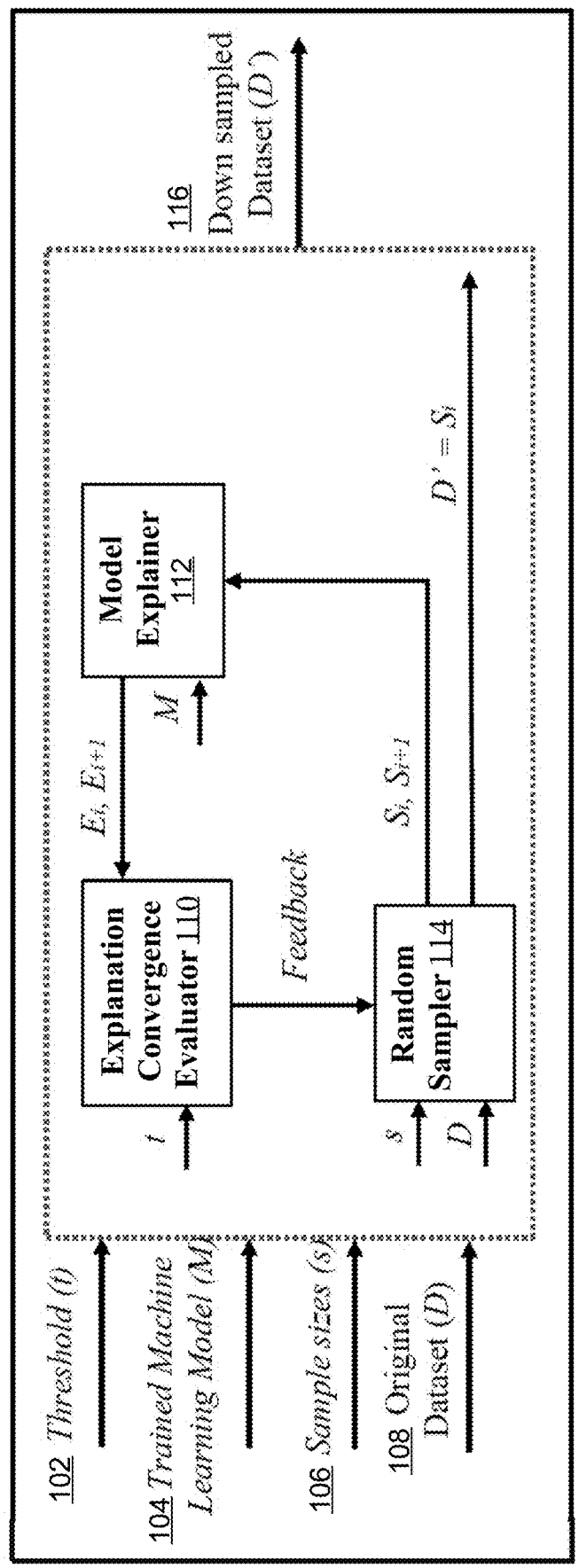
FIG. 1 illustrates a process of adaptive sampling in a block diagram according to embodiments disclosed herein.

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

End-to-end explanation techniques, which efficiently explain the behavior (feature importance) of any machine learning model on large tabular datasets, are disclosed. These techniques comprise two down-sampling methods to efficiently select a small set of representative samples of a high-dimensional dataset for explaining a machine learning model by making use of the characteristics of the dataset or of an explainer of a machine learning model to optimize the explanation quality. These techniques significantly improve the explanation speed while maintaining the explanation quality of a full dataset evaluation.

In some embodiments, a down-sampling method comprises adaptively increasing the size of a sample dataset until the feature importance values produced by a model explainer are considered to be converging.

In some embodiments, a down-sampling method comprises selecting an initial sample dataset, identifying clusters from the initial sample dataset, and then selecting representatives from the clusters to form the final sample dataset.

The techniques disclosed in this application produce several technical benefits. The techniques significantly improve the explanation speed while maintaining the explanation quality of a full dataset evaluation. The techniques do not require prior knowledge of the nature of machine learning models being explained in terms of related features or the nature of the datasets on which the machine learning models will run while being explained. Therefore, the techniques enable efficient, high-quality explanation of complex machine learning models to not only effectively learn from high-dimensional data and make predictions but also provide accurate explanations for the learning results.

Explanation of Machine Learning Models

Machine learning explainability (MLX) is the process of explaining and interpreting machine learning models. MLX can be broadly categorized into local explainability and global explainability. Local explainability explains why a machine learning model made a specific prediction corresponding to a given sample (answers the question: "why did my model make a specific prediction?"). Global explainability explains the general behavior of the machine learning model as a whole (answers the question: "how does my model work?" or "what did my model learn from the training data"?). MLX techniques can further be classified as model-agnostic or model-specific. An MLX technique is model-agnostic when an explainer of a machine learning model ("model explainer") is separated from the underlying machine learning model being explained, treating the machine model as a black-box. An MLX technique is model-specific when the model explainer is tied to the underlying machine learning model's architecture or properties. The techniques disclosed in this application comprise global, model-agnostic model explainers.

In some embodiments, a system disclosed in this application accepts three inputs, an original dataset, a machine learning model, and a model explainer. Each item in the original dataset can be represented as a feature vector of feature values. The machine learning model would take a set of feature vectors as input. The original dataset could be same dataset that the machine learning model was trained on (e.g., the training dataset) or some other representative dataset used to evaluate the machine learning model's behavior (e.g., test dataset, validation dataset, or any other with a similar data distribution as the training dataset). The model explainer can provide an explanation of executing the machine learning model on the original dataset or any subset thereof. An explanation includes data that associates with each feature a value representing the importance of the feature to a particular machine learning model. For example, the explanation can be represented as ordered pairs, each pair comprising a feature name and a corresponding importance value.

In some embodiments, the system, through a down sampler module, generates a sample dataset smaller than the original dataset but is representative of the original dataset. The model explainer then provides an explanation of executing the machine learning model on the sample dataset as an explanation of executing the machine learning model on the original dataset. Because it is efficient to generate the sample dataset and to execute the machine learning model on the sample dataset, the system improves the speed of generating an explanation. Because the sample dataset is representative of the original dataset, the system often maintains the quality of the explanation.

In some embodiments, the down sampler module contains two main approaches. The first approach, adaptive sampling, is driven by the nature of the model explainer. This first approach iteratively and adaptively selects the smallest set of representative samples to optimize the explanation quality. The second approach, fast clustering-sampling, is driven by the nature of the original dataset. This second approach focuses on a combination of clustering and sampling to ensure that a sufficient set of samples, which cover the dataset distribution, are selected.

Model Explainer

In one embodiment, as discussed above, a model explainer can provide an explanation of executing a machine learning model on an original dataset. The explanation can be represented as ordered pairs of feature names and their relative importance values. One example model explainer that is model agnostic is a permutation feature importance algorithm known to someone skilled in the art.

To explain the global behavior of a machine learning model, permutation-based explanation techniques evaluate how the predictions of the machine learning model change on permuted versions of a given dataset (which may come from a similar distribution to the dataset on which the machine learning model was trained). A feature that, when permuted, has a larger effect on the machine learning model's predictions is considered to be more important than a feature that, when permuted, results in little-to-no change in the machine learning model's predictions.

In one definition, the permutation feature importance value of a feature with respect to a machine learning model is the decrease in the prediction score of the machine learning model executed on a variant of the original dataset where the feature is permuted compared to the base prediction score of the machine learning model executed on the original dataset. A feature is permuted when the feature values are randomly shuffled, for example. As the feature values are merely shuffled rather than changed, the distribution of feature values for the permuted feature is maintained. The prediction score of the machine learning model indicates the quality of the output of the machine learning model. For example, the prediction score can be the F1 score for classification or the R2 score for regression. To avoid issues resulting from random shuffling, the random shuffling and the calculation of the score difference can be repeated multiple times for a feature, and the average score difference can be taken as the permuted feature importance value for the feature.

In some embodiments, another global explanation model known to someone skilled in the art that provides feature importance can be used here instead of the permutation feature importance. One example is to execute SHAP on multiple samples from a dataset and take the mean SHAP value for each feature over the samples as the global importance of the features. The same approach can be applied to LIME.

Adaptive Sampling

In some embodiments, the down sampler module implements an adaptive sampling method, which automatically down samples a large dataset of size D: $n \times f$, with n rows and $f$ columns, to a smaller, representative subset. Each column corresponds to a feature, and each row corresponds to the feature vector for an item.

FIG. 1 illustrates a process of adaptive sampling in a block diagram according to the embodiments disclosed herein. In some embodiments, the adaptive sampling method randomly samples progressively larger subsets from an original dataset until the explanation of applying a machine learning model on the subset begins to stabilize. The adaptive sampling method accepts an original dataset 108 of items, each item having one or more features, and a machine learning model 104 as input data. The adaptive sampling method can optionally accept a threshold 102 and a list of sample sizes 106 as input data. The adaptive sampling method produces a down-sampled dataset 116 and a corresponding explanation for applying the model explainer 112 to the machine learning model 104 on the down sampled dataset 116 as output data.

In some embodiments, the adaptive sampling method is implemented as follows:
Let the list of sample sizes 106 be a sorted list that contains different values for the sizes of the random subsets and the threshold 102 define a convergence criteria for the explanation in terms of feature importance.
For i=1: length(list of sample sizes 106)
 1. Randomly select a subset $S_i$ of items of a size of the ith element of the list of sample sizes 106 using the random sampler 114 and obtain an explanation $E_i$ on $S_i$ using the model explainer 112.
2. Repeat step 1 with a subset $S_{i+1}$ of items of a size of the (i+1)th element of the list of sample sizes 106 so that $E_{i+1}$ is the explanation on $S_{i+1}$.
3. Calculate a score of $E_{i+1}$ relative to $E_i$ and determine whether the score is less than the threshold 102 using the explanation convergence evaluator 110.
4. If the score is less than the threshold 102, continue with larger sample sizes, otherwise return $S_i$ as the down sampled dataset 116 and $E_i$ as the explanation.

In some embodiments, in Step 4 above, $S_{i+1}E_{1+1}$ can be returned instead. The list of sample sizes 106 can be set by any approach that provides a method for increasing the number of samples to evaluate. A static range of dataset percentages (fraction of total samples), such as 0.01, 0.02, 0.05, 0.1, 0.15, 0.2, 0.25, and 0.5, could be used to dictate the number of samples to evaluate at each step of the adaptive sampling method. When the dataset is large, e.g., >100,000 samples, some specific minimum values to evaluate, such as 1,000 samples, can be also set. A dynamic approach, which increases the number of evaluated samples by a varying amount depending on the stability of the explanation, could also be used. In this approach, when there is a large change in the explanation in terms of the feature importance order or values, a larger increase in the number of samples to evaluate next could be tried, but when there is a small change, then maybe a smaller increase (as opposed to a static increase in the sample sizes) can be used. The change in the explanation is further discussed below. The change in the number of samples to evaluate next could be calculated as a number proportional to the amount of change in the explanation.

In some embodiments, the explanation convergence evaluator 110 computes the Normalized Discounted Cumulative Gain (NDCG) score as an indicator of how much the explanation has changed and compares the NDCG score with a predetermined threshold. This metric indicates a similarity of two lists of ordered or ranked features, favoring top ranked matches more than low ranked ones. The NDCG score ranges between 0 and 1, with 1 meaning that the two lists are identical and values closer to 0 indicating that the rankings differ substantially.

In some embodiments, the predetermined threshold can be supplied by a user. Alternatively, an error tolerance in terms of individual features can be supplied by a user, and the predetermined threshold can be calculated accordingly. For example, the error tolerance can be specified in terms of N features with top importance values that need to be ordered correctly. The NDCG score for two explanations where one is the ground truth and the other one has only the N features with top importance values ordered correctly can be used as the predetermined threshold.

In some embodiments, the explanation convergence evaluator 110 can include other approaches. For example, the change in the explanation can be calculated as a weighted sum that includes a term for each feature whose position or importance value has changed in the feature importance evaluation, where the weight can depend on the original position in the order, the changed position in the order, or the change in the importance value. Other similarity or distance measures known to someone skilled in the art could be used to determine the difference between the two lists of ordered or ranked features and associated importance values. The threshold 102 could be a constant value or could be expressed in terms of a percentage of the last difference, such as 10%.

Fast Clustering-Sampling

When an original dataset comprises multiple clusters that are located far apart from one another, subsets obtained from directly random sampling the original dataset may not sufficiently represent all the clusters of the original dataset. However, subsets obtained from randomly sampling clusters of the original dataset can ensure that all of the identified clusters are covered.

In some embodiments, the down sampler module implements a fast clustering-sampling method, which automatically down samples a large dataset of size D: $n \times f$, with n rows and $f$ columns, to a smaller, representative subset. Each column corresponds to a feature, and each row corresponds to the feature vector for an item.

Figure 2:
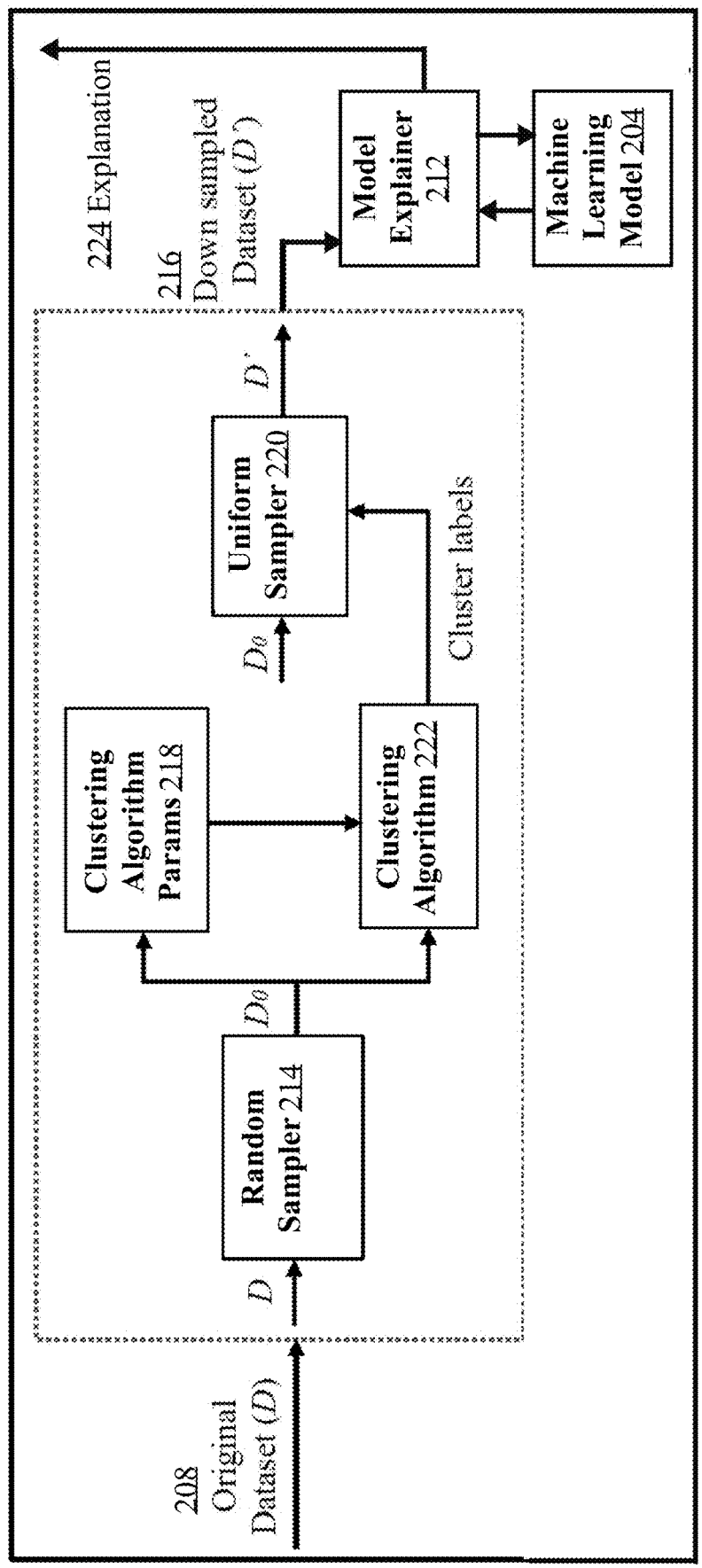
FIG. 2 illustrate a process of fast clustering-sampling in a block diagram according to embodiments disclosed herein.

FIG. 2 illustrates a process of fast clustering-sampling in a block diagram according to the embodiments disclosed herein. In some embodiments, the fast clustering-sampling method lightly down-samples an original dataset to generate an initial subset that is sufficiently large and representative of the original dataset, applies a clustering algorithm on the initial subset, and uniformly samples each cluster. Clustering the initial subset provides a time saving compared to clustering the original dataset. The fast clustering-sampling method accepts an original dataset 208 of items, each item having one or more features, as input data. The fast clustering-sampling method produces a down-sampled dataset 216, and a corresponding explanation 224 can be generated by applying a model explainer 212 to a machine learning model 204 on the down sampled dataset 216 as output data.

In some embodiments, the fast clustering-sampling method is implemented as follows:
1. Randomly down sample the original dataset 208 of items to an initial subset $D_0$ using the random sampler 214 with a first sampling factor.
2. Choose parameter values 218 for the clustering algorithm 222.
3. Cluster the data points in the initial subset $D_0$ using the clustering algorithm 222 with the parameter values 218 obtained through step 2.
4. Draw random samples from each of the identified clusters using the uniform sampler 220 with a second sampling factor and add the drawn samples to the down-sampled dataset 216.
5. Finally, obtain an explanation 224 on the down-sampled dataset 216 using the model explainer 212.

In some embodiments, the clustering algorithm 222 is a density-based clustering algorithm, such as density-based spatial clustering of applications with noise (DBSCAN) known to someone skilled in the art, for summarizing clusters in the large dataset into a smaller subset of representative samples. Other clustering algorithms for high-dimensional data known to someone skilled in the art can be used, such as CLIQUE, PROCLUS, or FIRES.

In some embodiments, parameter values 218 for the clustering algorithm 222 could be provided by the user or automatically identified. For example, for DBSCAN, the min_samples (the number of samples in a neighborhood for a point to be considered as a core point) and eps (the maximum distance between two samples for one to be considered as in the neighborhood of the other) parameters be set as follows according to Sander, Jörg, et al. "Density-based clustering in spatial databases: The algorithm gdbscan and its applications." Data mining and knowledge discovery 2.2 (1998): 169-194:
  i. Set min_samples=$2*f$.

ii. Run K-nearest neighbor algorithm on Do with K=min_samples−1
iii. Sort the distances between the data points in $D_O$ and their Kth neighbor sample. When the sorted distances are plotted, the knee point in the plot will be a proper value for the eps parameter.

Statistical guarantees that the initial subset sufficiently covers the clusters of the original dataset are provided in Jang, Jennifer, and Heinrich Jiang. "DBSCAN++: Towards fast and scalable density clustering." arXiv preprint arXiv:1810.13105 (2018), for example. Such statistical guarantees generally impose requirements on the relationships between the "core points" of the initial subset and "core points" of the ground truth and between the "core points" of the initial subset and "core points" of the original dataset. In some embodiments, the first sampling factor can be set to the minimum of 20,000 samples and 50% of the original dataset based on given experimental results to maintain a reasonable likelihood that initial subset still covers all the clusters of the original dataset and yet can significantly cut down the clustering time.

In some embodiments, the second sampling factor is tuned for different datasets and models. As an example, given a set of potential values for the second sampling factor, a grid (or exhaustive) search approach can find an optimal value which achieves highest explanation quality. Other approaches that explore a reduced search space can be used, such as a random search or Bayesian optimization. The second sampling factor can be set such that the size of the down-sampled dataset is 0.25 of the size of the initial subset based on given experimental results.

Experiments with given datasets show that the adaptive sampling method can significantly improve the speed of forming an explanation over the baseline associated with the original dataset without sacrificing the quality of the explanations. Furthermore, for high-dimensional datasets with multiple clusters of different densities, the fast clustering-sampling method could efficiently explain the global behavior of black-box machine learning models, without missing important information from the dataset distribution.

In some embodiments, given an original dataset, the adaptive sampling method can be applied first due to its speed advantage. When the performance of the adaptive sampling method is unsatisfactory, such as when the down-sampled dataset is larger than a threshold or when the explanation does not converge after a certain number of iterations, the fast clustering-sampling method could be applied next. Alternatively, the fast clustering-sampling method can be executed directly when the number of columns of the original dataset, which is indicative of the dimensionality of the original dataset, is higher than a certain threshold.

In some embodiments, the explanation for applying the machine learning model on the down-sampled dataset is transmitted to or displayed by a device. For example, the ordered pairs of features, each pair having a feature name and a corresponding importance value, can be displayed.

Example Processes

Figure 3:
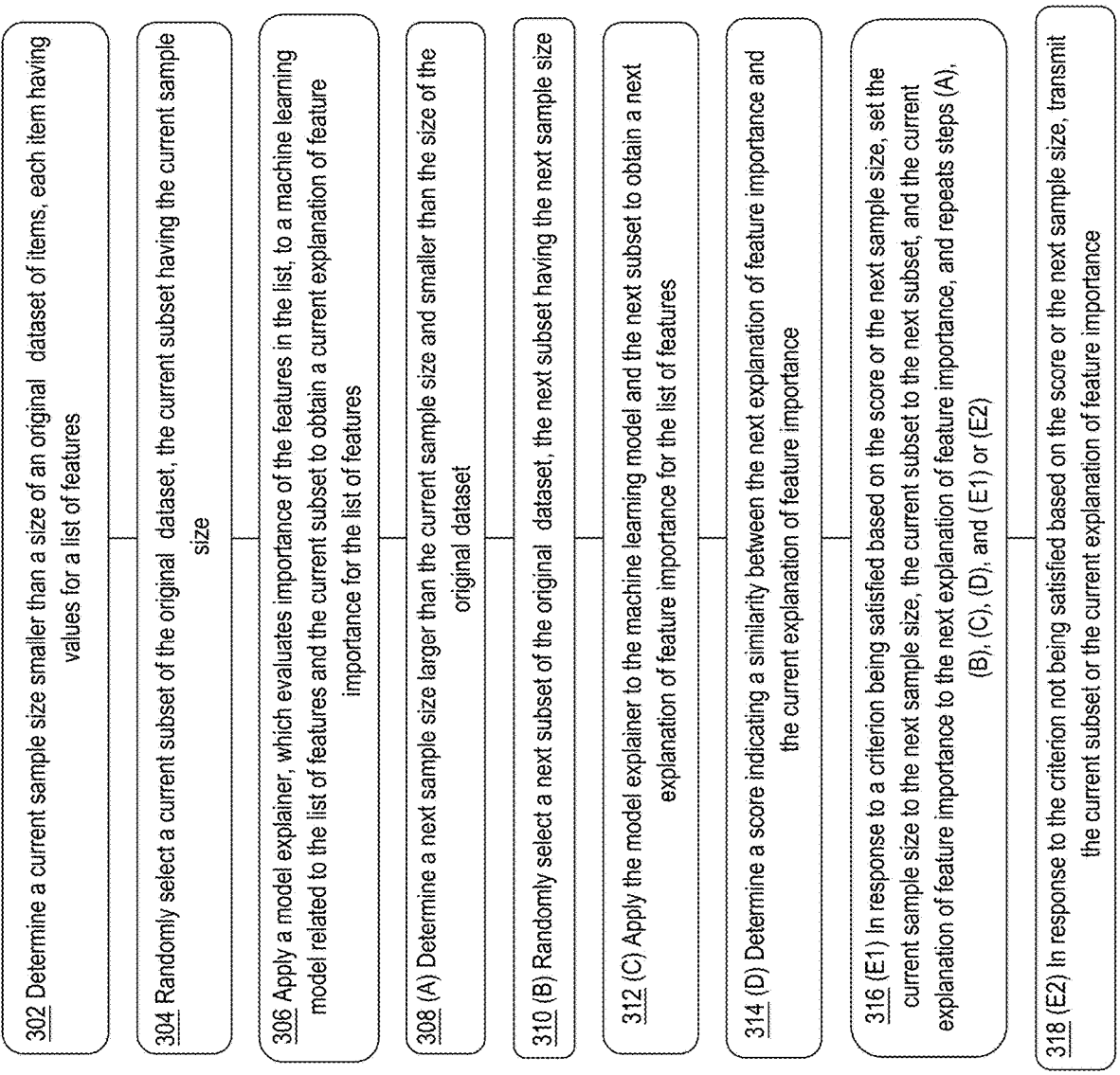
FIG. 3 illustrates a process of adaptive sampling in a flowchart according to embodiments disclosed herein.

FIG. 3 illustrates a process of adaptive sampling in a flowchart according to the embodiments disclosed herein.

At block 302, a system determines a current sample size smaller than a size of an original dataset of items, each item having values for a list of features.

At block 304, the system randomly selects a current subset of the original dataset, the current subset having the current sample size.

At block 306, the system applies a model explainer, which evaluates importance of the features in the list, to a machine learning model related to the list of features and the current subset to obtain a current explanation of feature importance for the list of features.

In some embodiments, applying the model explainer to a machine learning model and the current subset comprising executing the machine learning model on the current subset to obtain a prediction for the current subset; executing the model explainer on the prediction to generate a prediction score based on a known outcome for the current subset; and calculating an importance value for a feature of the list of features based on the prediction score.

In some embodiments, the importance of the features in the list is represented by ordered pairs, each having a feature name and a corresponding importance value.

In some embodiments, the model explainer explains general behavior of any machine learning model as a whole. In certain embodiments, the model explainer computes permutation feature importance from permuting values of each of the list of features in a given dataset.

At block 308, the system, via step (A), determines a next sample size larger than the current sample size and smaller than the size of the original dataset.

In some embodiments, the system further receives a list of sample sizes sorted in ascending order in advance. Determining the current sample size then comprises removing a first sample size from the list of sample sizes and taking the first sample size as the current sample size. Determines the next sample size then comprises, after determining the current sample size, removing a first sample size from the list of sample sizes and taking the first sample size as the next sample size.

In some embodiments, determining the next sample size comprises causing a larger difference or ratio between the next sample size and the current sample size when a score indicating a similarity between the next explanation of feature importance and the current explanation of feature importance is smaller and a smaller difference or ratio between the next sample size and the current sample size when the score is larger.

At block 310, the system, via step (B), randomly selects a next subset of the original dataset, the next subset having the next sample size.

At block 312, the system, via step (C), applies the model explainer to the machine learning model and the next subset to obtain a next explanation of feature importance for the list of features.

At block 314, the system, via step (D), determines a score indicating a difference between the next explanation of feature importance and the current explanation of feature importance. In some embodiments, the score being a Normalized Discounted Cumulative Gain (NDCG) score.

At block 316, the system, via step (E1), in response to a criterion being satisfied based on the score or the next sample size, sets the current sample size to the next sample size, the current subset to the next subset, and the current explanation of feature importance to the next explanation of feature importance, and repeats steps (A), (B), (C), (D), and (E1) or (E2).

In some embodiments, the criterion comprising that the score is less than a threshold. In certain embodiments, the criterion comprising that the next sample size is not a last sample size in a given list of sample sizes used to determine the current sample size and the next sample size, or that the next sample size is less than a threshold.

At block 318, the system, via step (E2), in response to the criterion not being satisfied based on the score or the next sample size, transmits the current subset or the current explanation of feature importance.

Figure 4:
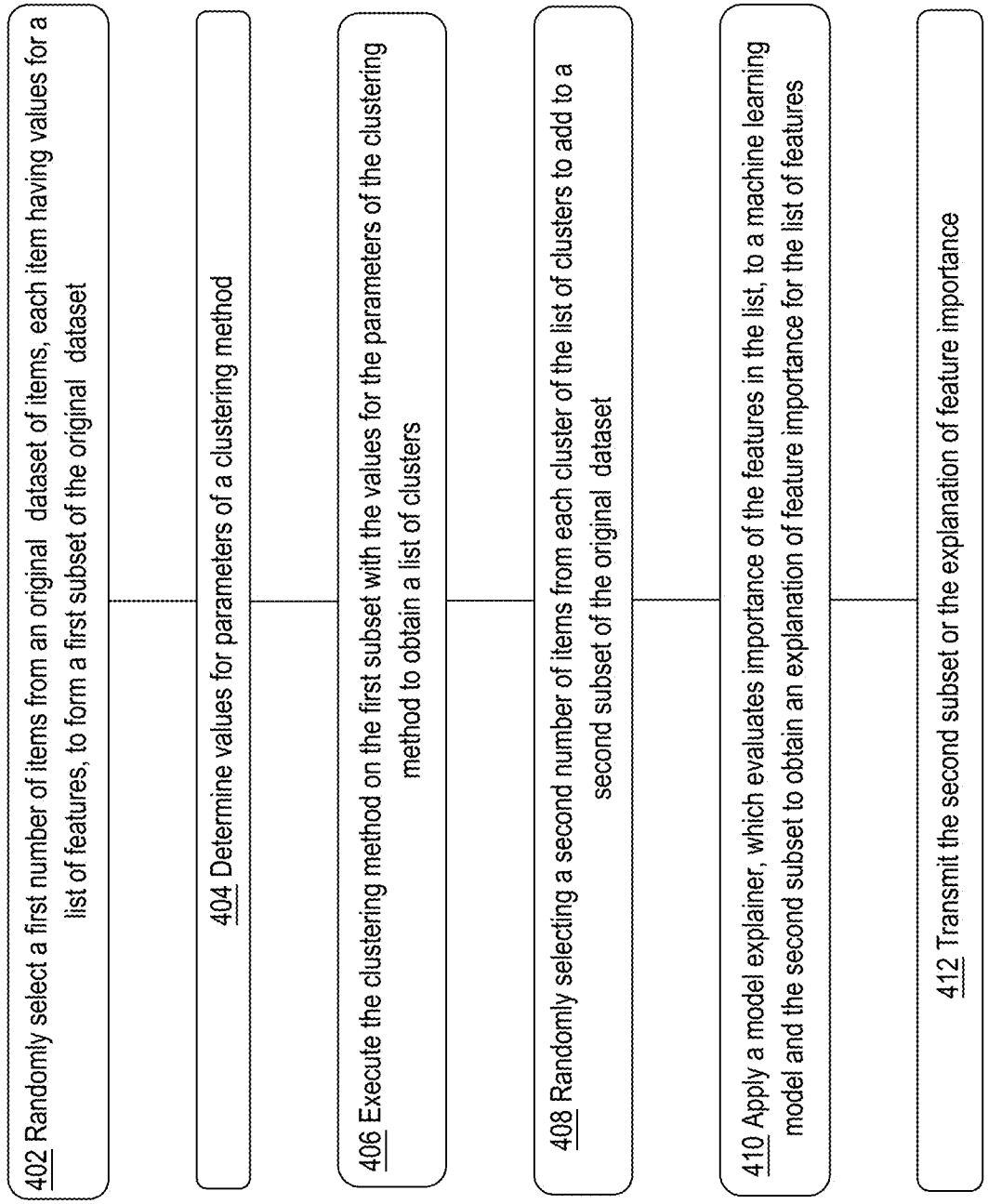
FIG. 4 illustrate a process of fast clustering-sampling in a flowchart according to embodiments disclosed herein.

FIG. 4 illustrates a process of fast clustering-sampling in a flowchart according to the embodiments disclosed herein.

At block 402, a system randomly selects a first number of items from an original dataset of items, each item having values for a list of features, to form a first subset of the original dataset.

In some embodiments, the first number being a minimum of 20,000 and 50% of a size of the original dataset.

At block 404, the system determines values for parameters of a clustering method. In some embodiments, determining the values for the parameters of the clustering method comprises automatically calculating the values for the parameters of the clustering method based on the first subset.

At block 406, the system executes the clustering method on the first subset with the values for the parameters of the clustering method to obtain a list of clusters.

In some embodiments, the clustering method is DBSCAN. In certain embodiments, determining the values for the parameters of the clustering method then comprises setting min_samples, a number of items in a neighborhood for a point to be considered as a core point, to 2 times a length of the list of features; running a K-nearest neighbor algorithm on the first subset, with K being min_samples−1; sorting distances between items in the first subset and corresponding Kth neighbors; and setting eps, a maximum distance between two items for an item to be considered as in the neighborhood of the other, to be a knee point in a plot of the sorted distances.

At block 408, the system randomly selects a second number of items from each cluster of the list of clusters to add to a second subset of the original dataset.

In some embodiments, the second number leading to a size of the second subset being 25% of a size of the first subset.

At bock 410, the system applies a model explainer, which evaluates importance of the features in the list, to a machine learning model and the second subset to obtain an explanation of feature importance for the list of features.

In some embodiments, the model explainer explains general behavior of any machine learning model as a whole. In certain embodiments, the model explainer computes permutation feature importance from permuting values of each of the list of features in a given dataset.

In some embodiments, the importance of the features in the list is represented by ordered pairs, each having a feature name and a corresponding importance value.

In some embodiments, the applying the model explainer to a machine learning model and the second subset comprises executing the machine learning model on the second subset to obtain a prediction for the second subset; executing the model explainer on the prediction to generate a prediction score based on a known outcome for the second subset; and calculating an importance value for a feature of the list of features based on the prediction score.

At block 412, the system transmits the second subset or the explanation of feature importance.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
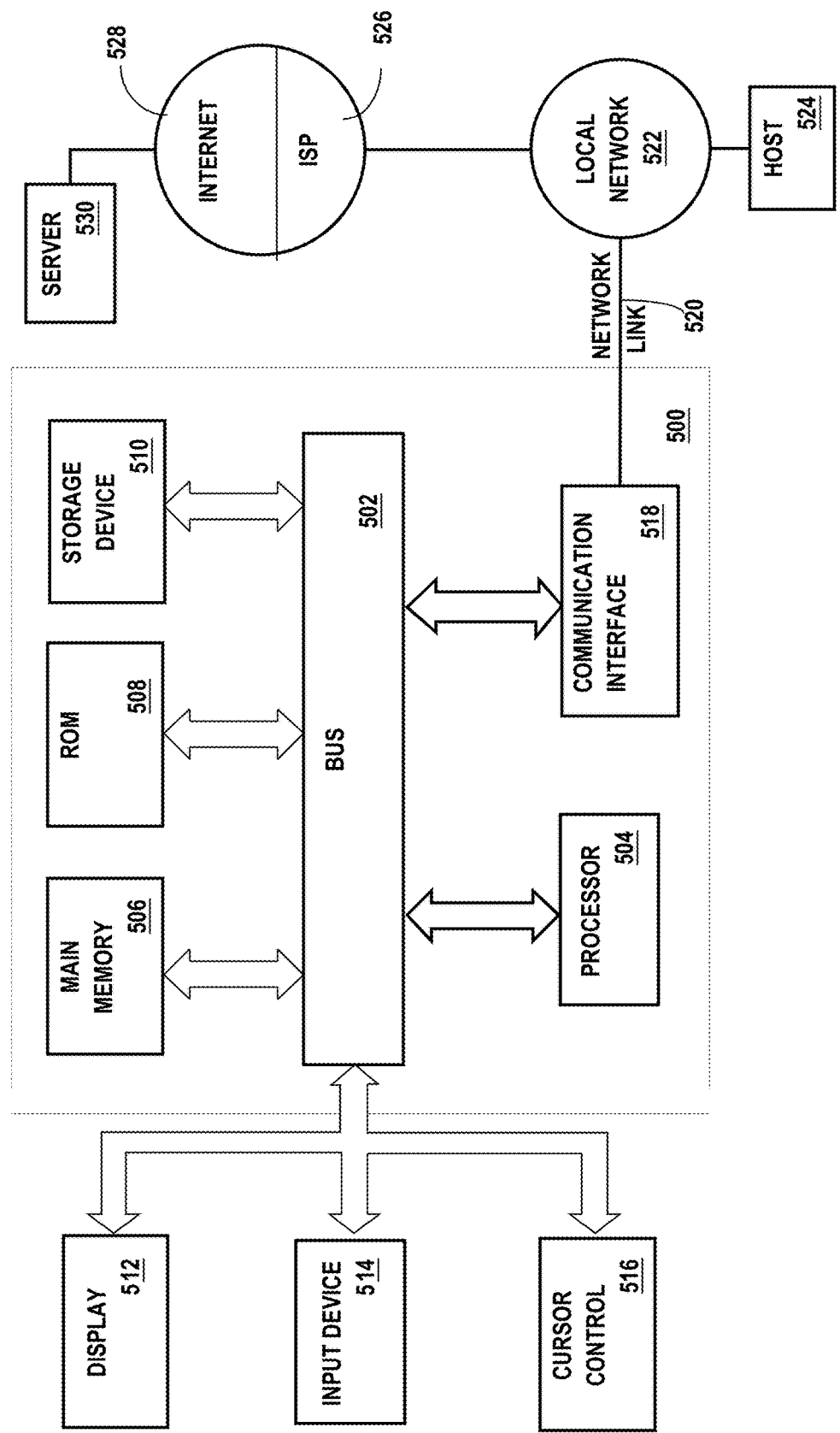
FIG. 5 is a block diagram that illustrates a computer system upon which an embodiment of the approach may be implemented.

For example, FIG. 5 is a block diagram that illustrates a computer system 500 upon which an embodiment of the approach may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Cloud Computing Overview

The techniques described herein are implemented using one or more processing solutions, examples of which include distributed systems, clustered computing systems, and cloud computing systems. In an embodiment, database management system 100 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to database management system 100, or to other entities within this description, is controllable via an interface that is exposed at a cloud computing system.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A computer-implemented method of building a sample dataset for an explainer of feature importance for machine learning, comprising:
   for each sample size in a list of sample sizes that is ascending sorted, sequentially performing:
   a) randomly selecting a current subset of items from an original dataset, each item in the original dataset having values for a list of features, the current subset of items having a size that is said sample size, and
   b) applying a model explainer, which evaluates importance of the features in the list of features, to a machine learning model related to the list of features and the current subset of items to obtain a current explanation of feature importance for the list of features;
   ceasing said sequentially performing when a convergence criterion is satisfied; and
   transmitting the current subset or the current explanation of feature importance.

2. The computer-implemented method of claim 1, wherein:
   the method further comprises determining a score indicating a similarity between the next explanation of feature importance and the current explanation of feature importance;
   determining the next sample size comprises causing a larger ratio between the next sample size and the current sample size when the score is smaller and a smaller ratio between the next sample size and the current sample size when the score is larger.

3. The computer-implemented method of claim 1, wherein the model explainer explains general behavior of any machine learning model as a whole.

4. The computer-implemented method of claim 1, wherein the model explainer computes permutation feature importance from permuting values of each of the list of features in a given dataset.

5. The computer-implemented method of claim 1, wherein the importance of the features in the list is represented by ordered pairs, each pair having a feature name and a corresponding importance value.

6. The computer-implemented method of claim 1, further comprising determining a Normalized Discounted Cumulative Gain (NDCG) score.

7. The computer-implemented method of claim 1, wherein:
   the method further comprises determining a score indicating a similarity between the next explanation of feature importance and the current explanation of feature importance;
   the convergence criterion comprising that the score is less than a threshold.

8. The computer-implemented method of claim 1, wherein:
   the method further comprises determining, in said list of sample sizes, a current sample size and a next sample size;
   the convergence criterion comprising that the next sample size is not a last sample size in said list of sample sizes, or that the next sample size is less than a threshold.

9. The computer-implemented method of claim 1, applying the model explainer to the machine learning model and the current subset comprising:
   executing the machine learning model on the current subset to obtain a prediction for the current subset;
   executing the model explainer on the prediction to generate a prediction score based on a known outcome for the current subset;
   calculating an importance value for a feature of the list of features based on the prediction score.

10. A computer-implemented method of building a sample dataset for an explainer of feature importance for machine learning, comprising:
    randomly selecting a first number of items from an original dataset of items, each item having values for a list of features, to form a first subset of the original dataset;
    determining values for parameters of a clustering method;
    executing the clustering method on the first subset with the values for the parameters of the clustering method to obtain a list of clusters;
    randomly selecting a second number of items from each cluster of the list of clusters to add to a second subset of the original dataset;
    applying a model explainer, which evaluates importance of the features in the list, to a machine learning model and the second subset to obtain an explanation of feature importance for the list of features;

transmitting the second subset or the explanation of feature importance.

11. The computer-implemented method of claim 10, the first number being a minimum of 20,000 and 50% of a size of the original dataset.

12. The computer-implemented method of claim 10, determining the values for the parameters of the clustering method comprising automatically calculating the values for the parameters of the clustering method based on the first subset.

13. The computer-implemented method of claim 10, the clustering method being density-based spatial clustering of applications with noise (DBSCAN).

14. The computer-implemented method of claim 13, determining values for parameters of a clustering method comprising:

setting min_samples, a number of items in a neighborhood for a point to be considered as a core point, to 2 times a length of the list of features;

running a K-nearest neighbor algorithm on the first subset, with K being min_samples-I; sorting distances between items in the first subset and corresponding Kth neighbors; setting eps, a maximum distance between two items for an item to be considered as in the neighborhood of the other, to be a knee point in a plot of the sorted distances.

15. The computer-implemented method of claim 10, the second number leading to a size of the second subset being 25% of a size of the first subset.

16. The computer-implemented method of claim 10, wherein the model explainer explains general behavior of any machine learning model as a whole.

17. The computer-implemented method of claim 10, wherein the model explainer computes permutation feature importance from permuting values of each of the list of features in a given dataset.

18. The computer-implemented method of claim 10, wherein the importance of the features in the list is represented by ordered pairs, each having a feature name and a corresponding importance value.

19. The computer-implemented method of claim 10, applying the model explainer to the machine learning model and the second subset comprising:

executing the machine learning model on the second subset to obtain a prediction for the second subset;

executing the model explainer on the prediction to generate a prediction score based on a known outcome for the second subset;

calculating an importance value for a feature of the list of features based on the prediction score.

20. One or more non-transitory computer-readable media storing instructions that, when executed by one or more processors, cause:

for each sample size in a list of sample sizes that is ascending sorted, sequentially performing:

a) randomly selecting a current subset of items from an original dataset, each item in the original dataset having values for a list of features, the current subset of items having a size that is said sample size, and b) applying a model explainer, which evaluates importance of the features in the list of features, to a machine learning model related to the list of features and the current subset of items to obtain a current explanation of feature importance for the list of features;

ceasing said sequentially performing when a convergence criterion is satisfied; and transmitting the current subset or the current explanation of feature importance.

21. The one or more non-transitory computer-readable media of claim 20, wherein:

the instructions further cause determining a score indicating a similarity between the next explanation of feature importance and the current explanation of feature importance;

determining the next sample size comprises causing a larger ratio between the next sample size and the current sample size when the score is smaller and a smaller ratio between the next sample size and the current sample size when the score is larger.

22. The one or more non-transitory computer-readable media of claim 20, wherein:

the instructions further cause determining, in said list of sample sizes, a current sample size and a next sample size;

the convergence criterion comprising that the next sample size is not a last sample size in said list of sample sizes, or that the next sample size is less than a threshold.

23. One or more non-transitory computer-readable media storing instructions that, when executed by one or more processors, cause:

randomly selecting a first number of items from an original dataset of items, each item having values for a list of features, to form a first subset of the original dataset;

determining values for parameters of a clustering method;

executing the clustering method on the first subset with the values for the parameters of the clustering method to obtain a list of clusters;

randomly selecting a second number of items from each cluster of the list of clusters to add to a second subset of the original dataset;

applying a model explainer, which evaluates importance of the features in the list, to a machine learning model and the second subset to obtain an explanation of feature importance for the list of features; and transmitting the second subset or the explanation of feature importance.

\* \* \* \* \*